US006583867B1

(12) United States Patent
Jennings et al.

(10) Patent No.: US 6,583,867 B1
(45) Date of Patent: Jun. 24, 2003

(54) SYSTEM AND METHOD FOR MONITORING OPTICAL FIBER INTEGRITY BETWEEN THE TELECOMMUNICATIONS PROVIDER AND A CUSTOMER'S PREMISES

(75) Inventors: Mark Richard Jennings, Andover, NJ (US); Frank Salvatore Leone, Berkeley Heights, NJ (US); Richard Joseph Pimpinella, Hampton, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/374,169

(22) Filed: Aug. 13, 1999

(51) Int. Cl.⁷ .............................................. G01N 21/00
(52) U.S. Cl. .................................................. 356/73.1
(58) Field of Search ........................... 356/73.1; 385/24, 385/39, 134–139, 48, 15–16, 100, 31–32; 359/109–127, 166, 168

(56) References Cited

U.S. PATENT DOCUMENTS 5,680,234 A * 10/1997 Darcie et al. ............... 359/110
5,694,511 A * 12/1997 Pimpinella et al. ......... 385/134

* cited by examiner

Primary Examiner—Tu T. Nguyen
(74) Attorney, Agent, or Firm—Gibbons, Del Deo, Dolan, Griffinger & Vecchione

(57) ABSTRACT

A system and method of monitoring and testing the integrity of a dedicated pair of optical fibers extending between a telecommunications provider to a customer facility through the optical fiber network, of the telecommunications provider. The system contains an optical transmission module, a monitoring module, and a first wavelength division multiplexing module which are located at the telecommunication provider's facility. A second wavelength division multiplexer module is located at or just prior to the customer's facility. The optical transmission module introduces test signals into the first dedicated optical fiber and which travels to the customer facility through the optical fiber network. At the customer facility, the test signal is looped into the second dedicated optical fiber. The test signal then returns to the telecommunications provider's facility, wherein the test signal is received and processed.

15 Claims, 4 Drawing Sheets

SYSTEM AND METHOD FOR MONITORING OPTICAL FIBER INTEGRITY BETWEEN THE TELECOMMUNICATIONS PROVIDER AND A CUSTOMER'S PREMISES

RELATED APPLICATIONS

This application is related to the following co-pending U.S. Patent Application:

U.S. patent application No. 09/432,057, entitled, INTEGRATED OPTICAL TRANSMITTER AND RECEIVER MODULE, (Jennings 14-21-41) filed Oct. 30, 1999, now issued U.S. Pat. No. 6,366,724, issued Apr. 2, 2002.

U.S. patent application No. 09/430,548, entitled, INTELLIGENT OPTICAL TRANSMITTER MODULE, (Jennings 9-16-36) filed Oct. 29, 1999, now issued U.S. Pat. No. 6,263,136, issued Jul. 17, 2001.

U.S. patent application No. 09/430,640, entitled MONITOR MODULE FOR A FIBER OPTIC MONITORING SYSTEM, (Jennings 10-17-37) filed Oct. 29, 1999.

BACKGROUND OF THE INVENTION

1. Field of the Invention

The present invention relates to systems and methods that are used to monitor and test the integrity of optical fibers between points. More particularly, the present invention relates to systems and methods of monitoring a set pair of optical fibers that lead to specific customer facility from the central office of a telecommunications provider.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, equipment is used at the central office to organize various optical fibers in the optical fiber network. In certain optical networks, the optical fibers at the central office are connected to dedicated pieces of equipment, such as optical signal transmitters, that serve only one purpose. If the optical fibers are to be connected to another piece of equipment, such as test equipment, the optical fibers must be manually connected to that new piece of equipment.

In more versatile applications, optical fibers are terminated at fiber administration systems at the central office. Fiber administration systems enable many different types of equipment to be connected to the optical fibers without having to reroute the optical fibers from their point of termination.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein.

Each optical distribution frame located at the central office typically defines a plurality of bays, wherein each bay houses several different type of dedicated equipment shelves, such as fiber distribution shelves. On each of the fiber distribution shelves are optical connection ports that receive the ends of all of the individual optical fibers that enter the central office and are contained within the optical fiber network. By terminating each optical fiber at an optical connection port on one of the different fiber distribution shelves, the location of each optical fiber becomes known within the overall assembly. Once terminated at a known address on one of the fiber distribution shelves, each optical fiber can be selectively coupled to equipment on other shelves of the fiber administration system or other optical equipment located at the central office. As a result, the optical signals sent along each optical fiber can be selectively controlled.

At the opposite end of the various optical fibers are the customers of the telecommunications provider. With customers that have smaller scale telecommunications needs, the optical signals transmitted on the optical fiber network are converted to electrical signals, prior to the customer's premises in a traditional manner. As such, the entire optical network is controlled and maintained by the telecommunications provider. However, with customers that have large scale telecommunication requirements, it is not uncommon for the telecommunications provider to run a pair of optical fibers from the optical network directly into the customer premises. One of the optical fibers transmits signals from the telecommunications provider to the customer and the other optical fiber transmits signals from the customer to the telecommunications provider.

With customers that receive optical fiber pairs from their telecommunications provider, all incoming and outgoing transmissions are directed through these optical fibers. Accordingly, to disconnect either of these optical fibers is to completely disrupt the telecommunications service to that customer.

When a customer reports trouble with a telecommunications transmissions, the problem can be either related to the optical fibers owned by the telecommunications provider or the telecommunications equipment owned by the customer. Since the optical fiber leading to the customer premises cannot be disconnected, it is difficult to pinpoint whether a problem is contained in the telecommunication provider's equipment of the customer's equipment. The result is that a technician from the telecommunications provider must be dispatched to the customer's premises and time consuming manual tests must be conducted to locate the exact point of the problem.

A need therefore exists for a system and method, whereby the integrity of an optical fiber pair leading to specific customer premises can be monitored and tested in a remote, automated procedure.

SUMMARY OF THE INVENTION

The present invention is a system and method of monitoring and testing the integrity of a pair of optical fibers that are received by a specific customer facility through the optical fiber network of a telecommunications provider. In one exemplary embodiment, the system contains an optical transmission module, a monitoring module, and two wavelength division multiplexing modules. The optical transmission module, the monitoring module and the first wavelength division multiplexing module are located at the telecommunication provider's facility. The second wavelength division multiplexing module is located at the customer's facility. The optical transmission module at the telecommunications provider's central office introduces test signals onto the first dedicated optical fiber of a customer facility, using the first wavelength division multiplexing module. The test signal travels to the customer facility through the optical fiber network. At the customer facility, the test signal is looped onto the second dedicated optical fiber using the second wavelength division multiplexing module. The test signal then returns to the telecommunication provider's facility, wherein the test signal is received by the monitor module, the optical transmission module and the monitor module are connected to a common controller. That controller can therefore compare the outgoing test signal to the incoming test signal and can calculate the integrity of the optical fibers that travel to and from that customer facility.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
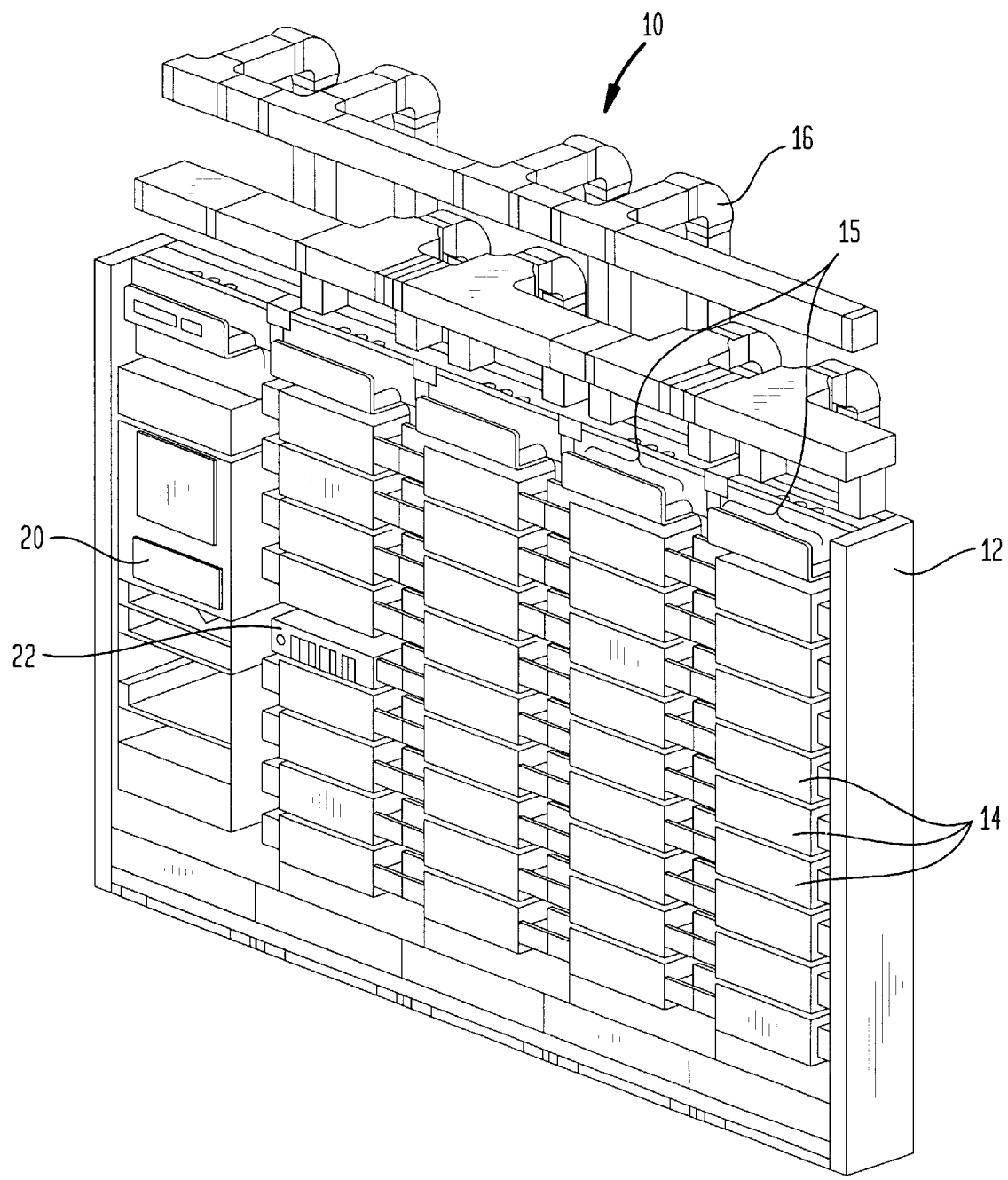
FIG. 1 is a perspective view of an optical fiber administration system containing a first plurality of bays and a second plurality of various types of shelves in each bay.

In FIG. 1, an exemplary fiber administration system 10 is shown. The fiber administration system 10 includes a fiber distribution frame 12 that is affixed in a set position to the floor of a central office. The fiber distribution frame 12 defines a plurality of bays 15. Each bay 15 is a vertical structure that supports a plurality of shelves 14. The shelves 14 come in one of three standard sizes, having a five inch height, a seven inch height or a nine inch height. The shelves 14 retain various optical components used in the administration of optical fibers.

A network of conduits 16 lead the various optical fibers (not shown) from the optical fiber network to the shelves 14. Included within the various optical fibers are dedicated pairs of optical fibers that lead to specific customer facilities.

In addition to the various shelves 14 in the fiber administration system 10, the fiber administration system 10 also includes a systems controller 20. The systems controller 20 runs the software that controls the fiber administration system 10.

Contained within the shelves 14 of the fiber administration system 10 can be at least one loop back monitoring shelf 22. The various dedicated pairs of optical fibers that lead to specific customer facilities are received by the loop back monitoring shelf 22 within the fiber administration system 10.

If a fiber administration system 10 is provided, dedicated loop back monitoring shelves need not be required. Rather, the later explained components that are normally held on the loop back monitoring shelves can be distributed in different shelves throughout the fiber administration system 10. The various components can intercommunicate by interfacing through the systems controller 20 of the fiber administration system.

Figure 2:
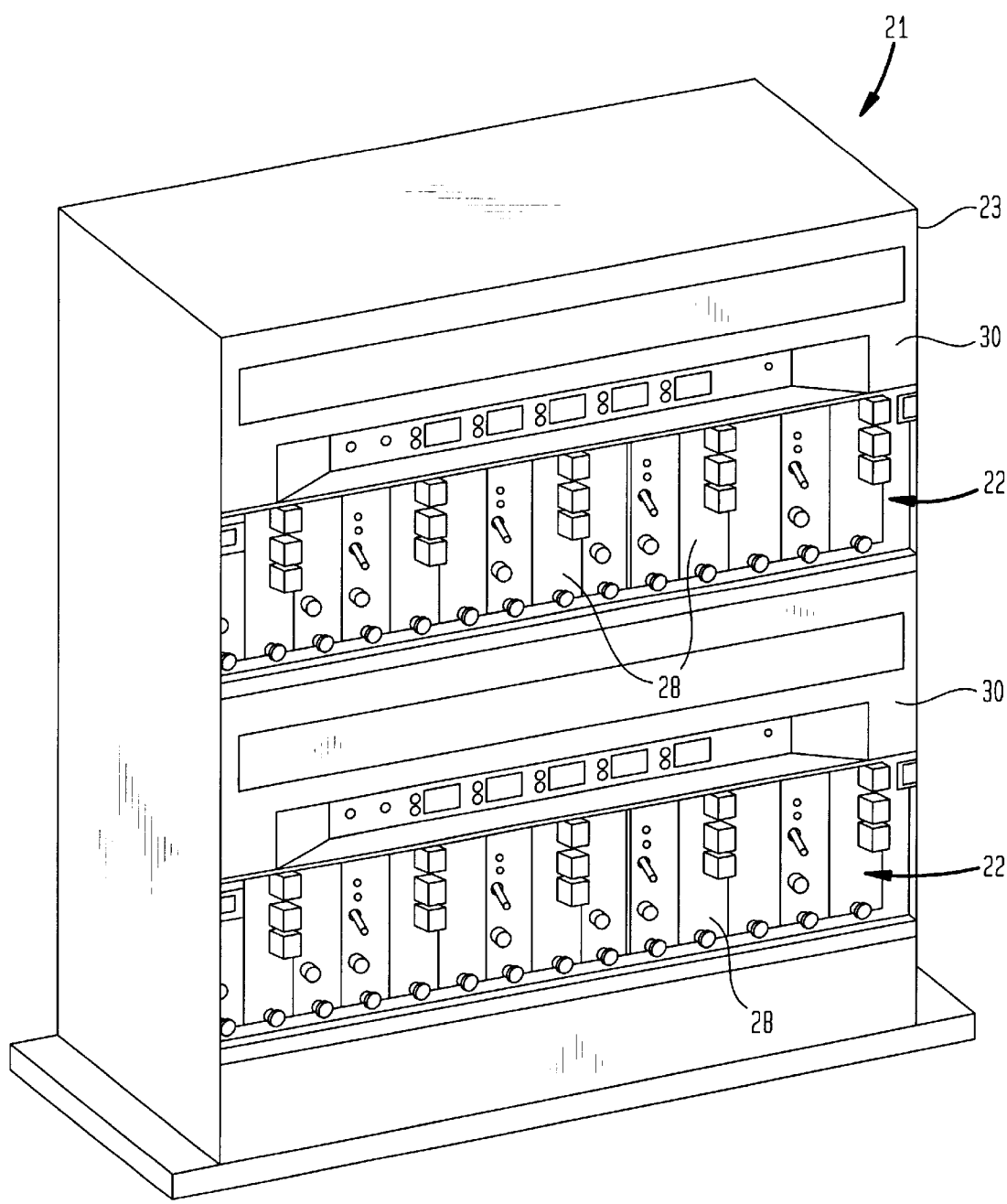
FIG. 2 is a perspective view of a dedicated piece of equipment containing loop back monitor shelves.

Not every optical fiber system uses a fiber administration system such as that shown in FIG. 1. Accordingly, in such systems, loop back monitoring shelves cannot be simply added to the structure of the fiber administration system. In such applications, the loop back monitoring shelves can be built into a standalone piece of equipment. Referring to FIG. 2, such a dedicated piece of equipment 21 is illustrated. In FIG. 2, a small frame 23 is provided. The small frame 23 retains at least one loop back monitoring shelf 22. In optical fiber networks that do not use fiber administration systems, the small frame 23 can be brought into the telecommunication provider's facility and the optical fibers of the optical fiber network can be manually interconnected with the loop back monitoring shelves 22.

Figure 3:
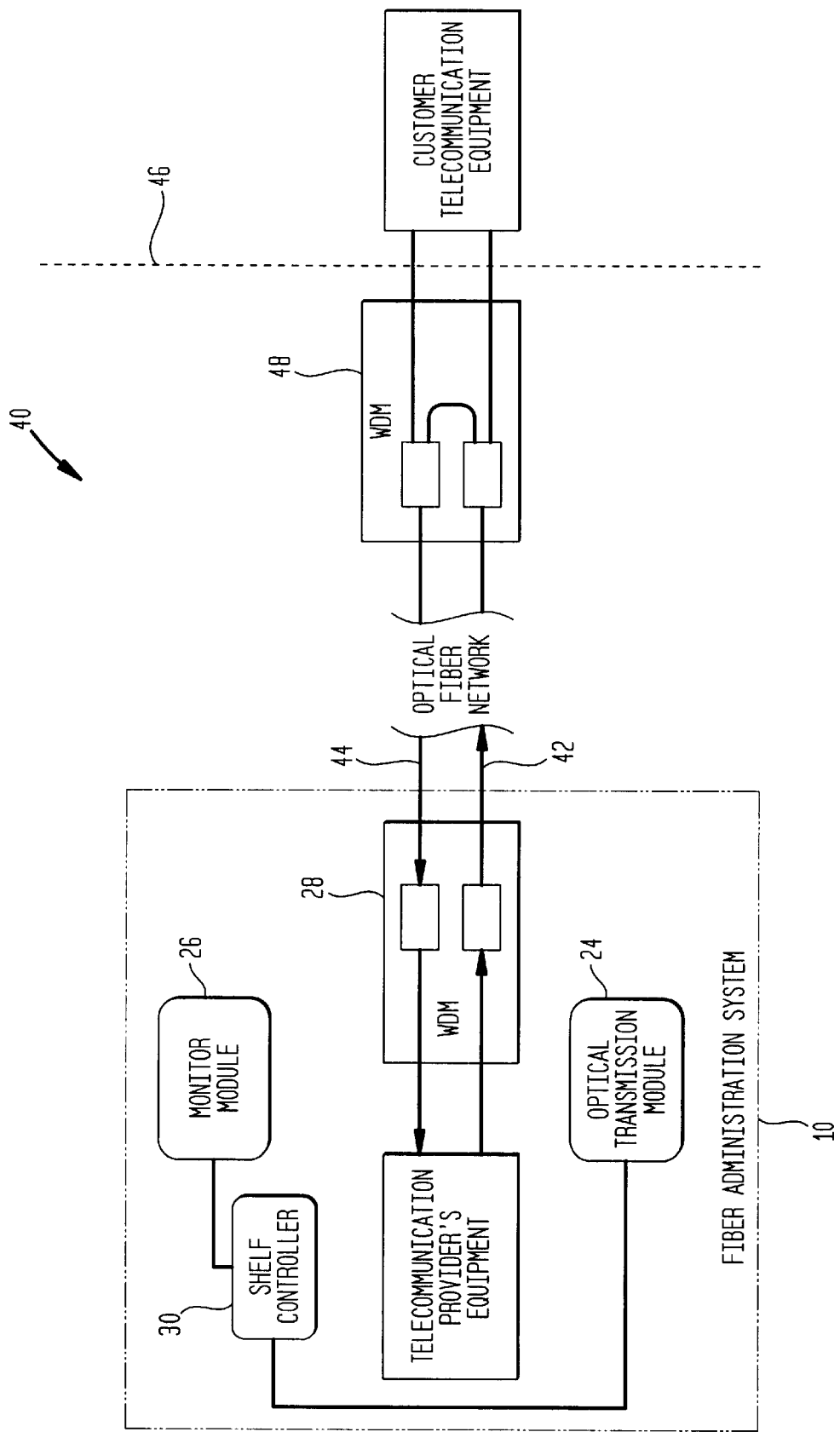
FIG. 3 is a perspective view of a loop back monitoring shelf in accordance with the present invention.

Regardless of whether the loop back monitoring system is embodied in a fiber administration system, distributed throughout a fiber administration system or is a stand-alone piece of equipment, the function and structure of the loop back monitoring system remains the same. Referring to FIG. 3, components of the loop back monitoring system are shown embodied on a loop back monitoring shelf 22. The showing of all the components on a single shelf is for convenience and it should be understood that different components can be distributed on different shelves. In FIG. 3, the loop back monitoring shelf 22 supports matched sets of modules. The matched sets of modules include an optical transmitter module 24, a monitor module 26 and a wavelength division multiplexing module 28. The two optical fibers that lead to a specific customer premises are coupled to the matched set of modules, wherein the outgoing optical fiber connects to the optical transmitter module 24 and the incoming optical fiber connects to the monitor module 26.

The loop back monitoring shelf 22 also contains a shelf controller 30. The shelf controller 30 is a programmable computer control that is compatible with the systems controller 20 (FIG. 1) of the overall fiber administration system 10 (FIG. 1) or some other external systems controller. The shelf controller 30 gathers information from both the optical transmitter module 24 and the monitor module 26 for use in statistical analysis and the continued operation of the loop back monitoring shelf 22 within the fiber administration system 10 (FIG. 1).

For each optical fiber pair, that is joined to the loop back monitoring shelf, a matched set of modules is provided. As has been previously stated, the matched set of modules includes a wavelength division multiplexing module 28, a monitor module 26 and an optical transmitter module 24. The structure of the wavelength division multiplexing module 28 is known in the field of fiber administration systems and is not again described herein. The structure of the monitor module 26 is disclosed in related co-pending U.S. patent application No. 09/430,640, entitled, Monitor Module For A Fiber Optic Monitoring System, and filed Oct. 29,1999, the disclosure of which is incorporated into this application by reference.

The structure of the optical transmitter module 24 is disclosed in related co-pending U.S. patent application No. 09/430,548, entitled, Intelligent Optical Transmitter Module, and filed Oct. 29, 1999, now issued U.S. Pat. No. 6,263,136, issued Jul. 17, 2001, the disclosure of which is also incorporated into this application by reference.

Figure 4:
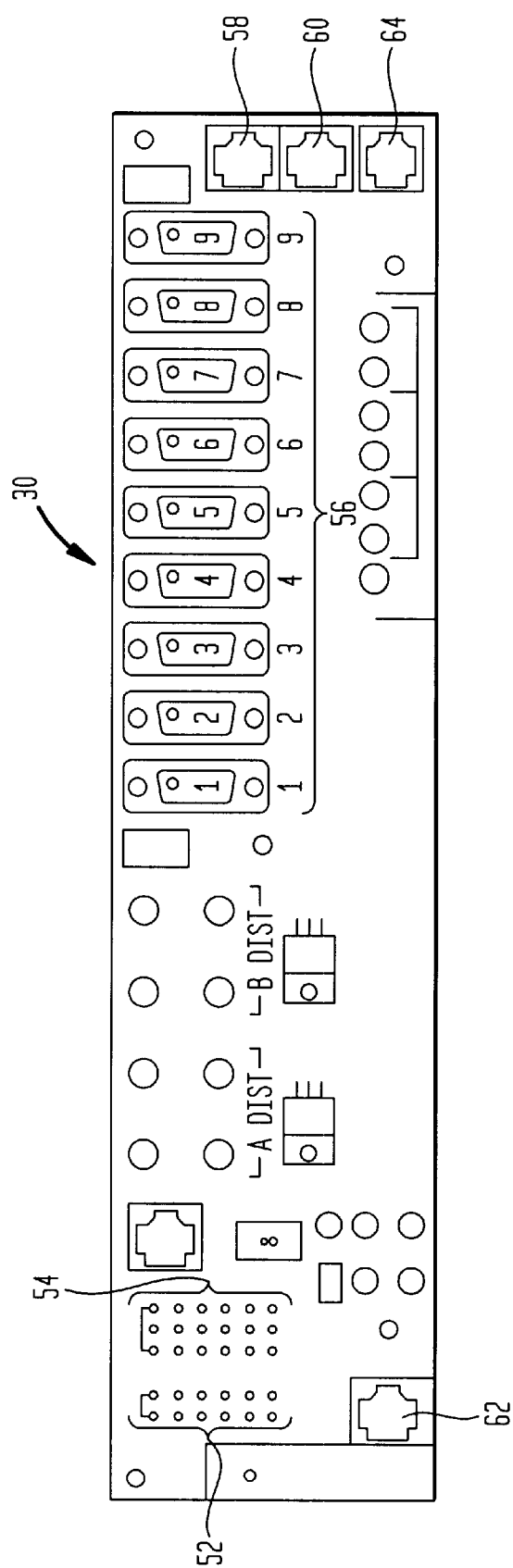
FIG. 4 is a schematic view of the present invention look back monitoring system, illustrating its method of operation.

Referring now to FIG. 4, an overview of the entire loop back monitoring system 40 is shown. In the system, optical communications are sent through a pair of optical fibers 42, 44 between the telecommunications provider and the customer premises. The first of the optical fibers 42 carries signals from the telecommunications provider to the customer. The second of the optical fibers 44 carries signals from the customer to the telecommunications provider. A line of demarcation 46 is provided to show the point where the optical fibers 42, 44 become the property and responsibility of the customer, rather than that of the telecommunications provider. The optical transmissions between the telecommunications provider and the customer premises are at a first transmission frequency f1.

The loop back monitoring system 40, as applied to one pair of dedicated of optical fibers 42, 44, contains two wavelength division multiplexing modules 28, 48. The first wavelength division multiplexing module 28 is provided at the fiber administration system 10 at the central office of the telecommunications provider. The second wavelength division multiplexing module 48 is provided just prior to the line of demarcation 46.

As has been previously stated, an optical transmitter module 24 is provided for each pair of optical fibers that are dedicated to a specific customer. The optical transmitter module 24 is capable of transmitting at least one optical test signal at a second transmission frequency f2, which is either above or below the primary transmission frequency f1. The optical test signal is added to the outgoing primary transmission by the first wavelength division multiplexing module 28.

Although numerous different test signals can be generated by the optical transmission module 24, in the preferred embodiment, the optical transmission module can produce a continuous wave test signal, a tone test signal and a pulsed tone test signal all at selectable power levels.

As the test signal from the optical transmission module 24 is added to the primary transmission signal by the first wavelength division multiplexing module 28, a multiplexed signal is sent to the customer premises through the fiber optic network. Just prior to the multiplexed signal being received at the customer premises, the test signal is removed from the incoming transmission by the second wavelength division multiplexing module 48.

The second wavelength division multiplexing module 48 removes the test signal from the optical fiber 42 of the incoming transmission and loops that test signal onto the second optical fiber 44 of the outgoing transmission. The multiplexed signal then returns through the fiber optic network to the first wavelength division multiplexing module 28. In the first wavelength division multiplexing module 28, the test signal is again removed from the primary transmission and is directed to the monitor module 26.

The monitor module 26 reads the test signal and converts the test signal into electronic data. The data is then read by the shelf controller 30, wherein the shelf controller 30 can compare the signal transmitted by the optical transmitter module 24 to the signal received by the monitor module 26. Since the test signal passes through the full length of both optical fibers between a central office and a customer's premises, a comparison between the transmitted test signal and the received test signal provides a comprehensive analysis of the quality of the link between the central office and the customer's premises.

The shelf controller 30 is compatible with the systems controller 10 (FIG. 1) of the fiber administration system. Accordingly, the shelf controller 30 and both the optical transmitter module 24 and the monitor module 26 can be controlled through the fiber administration system 10 (FIG. 1) either by a present technician or a remote technical operator.

Since the shelf controller 30 is coupled to both the optical transmission module 24 and the monitor module 26, the systems controller 30 can monitor the status of these components as well as the optical fibers 42, 44 that extend between these components. The systems controller 30 can therefore detect different types of alarm conditions. The systems controller 30 can indicate different types of non-critical alarms, wherein either the optical transmission module 24 of the monitor module 256 is malfunctioning. Alternatively, the system controller 30 can also detect critical malfunctions when the quality of the optical fibers 42, 44 extending between the customer facility and the telecommunications provider has degraded below an acceptable level. In addition to actively monitoring the optical fibers 42, 44, the present invention system can launch specific quality tests upon complaint by the customer facility. The specific tests can confirm the monitoring data and can indicate whether or not the complained about defect was indeed caused by the telecommunication provider's equipment.

Both the optical transmitter module 24 and the monitor module 26 contain manual interface controls for a technician to use when performing various maintenance tasks on the overall system. The manual interface controls are in the form of buttons and switches as is shown in FIG. 4. The functionality of the manual interface controls is controlled by the shelf controller 30. In this manner, the manual interface controls can be disabled from a remote location, via a computer link to the shelf controller 30. The disabling of the manual control will prevent these controls from being inadvertently engaged of mistakenly engaged by an untrained technician.

Referring now to FIG. 4, the rear of the shelf controller 30 is shown. On the rear of the shelf controller 30 are located a plurality of status input jumper ports 52. The status input jumper ports 52 selectively receive shorting jumper connectors (not shown) that are used to interconnect the various status input jumper ports 52. By selectively shorting different status input jumper ports 52 to one another, the operational mode of the shelf controller 30 can be varied. For example, utilizing the status input jumper ports 52, the manual controls on the optical transmitter module 24 (FIG. 3) or the monitor module 26 (FIG. 3), can be selectively enabled and disabled.

An array of alarm interface pins 54 are also disposed on the rear of the shelf controller 30. The alarm interface pins 54 are used to attach the shelf controller 30 to an external alarm system. The different alarm interface pins 54 are used for different types of alarms. For example, some alarm interface pins 54 correspond to critical alarms that indicate optical transmission failure and other pins correspond to lesser non-critical alarms.

The rear of the shelf controller 30 contains various connectors 56 that provide power, ground and control commands to the modules retained by the loop back shelf 22 (FIG. 2). The shelf controller itself interconnects with other computers via various connector ports. A first connector port 58 is used to interconnect the shelf controller 30 to the systems controller 20 (FIG. 1) of the fiber administration system or some other external computer. A second connector port 60 is used to connect the shelf controller 30 to other controllers in different bays. A third connector port 62 is used to serially interconnect the shelf controller 30 to other shelf controllers in the same bay. Auxiliary connector ports 64 may be present for future use.

It will be understood that the embodiment of the present invention system and method specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. In a telecommunications system where two dedicated optical fibers extend from the central office of a telecommunications provider to provide signals at a first primary transmission frequency to a customer facility through an optical fiber network, a method of remotely testing the two optical fibers, comprising the steps of:

introducing an optical test signal at a second frequency above or below the primary transmission frequency into a first of the two dedicated optical fibers at the central office of the telecommunications provider;

providing a wavelength division multiplexer at or just prior to the customer facility that is coupled to both of the two dedicated optical fibers wherein said wavelength division multiplexer removes said optical test signal from the first of the two dedicated optical fibers;

looping said optical test signal removed from the first of the two dedicated optical fibers by the wavelength division multiplexer to the second of the two dedicated optical fibers to return the test signal at the second frequency to the central office of the telecommunications provider;

monitoring said optical test signal in the second of the two dedicated optical fibers at the central office; and comparing the optical test signal introduced into the first of the two dedicated optical fibers to the optical test signal received from the second of the two dedicated optical fibers at said central office, thereby determining losses in the two dedicated optical fibers.

2. The method according to claim 1, wherein said step of introducing an optical test signal into a first of two dedicated optical fibers, includes the substeps of:

coupling a first wavelength division multiplexer to the first of the two dedicated optical fibers;

providing a test signal source;

coupling said test signal source to said first wavelength division multiplexer, wherein said first wavelength division multiplexer introduces the optical test signal from said test signal source into the first of the two dedicated optical fibers.

3. The method according to claim 2, wherein said step of monitoring said optical test signal includes the substeps of:

coupling said first wavelength division multiplexer to the second of the two dedicated optical fibers;

providing an optical signal monitor;

coupling said optical signal monitor to said first wavelength division multiplexer, wherein said first wavelength division multiplexer removes said optical test signal from the second of said two dedicated optical fibers and directs said optical test signal into said optical signal monitor.

4. The method according to claim 3, wherein said test signal source, said optical signal monitor and said first wavelength division multiplexer are separate modules contained within a shelf of a fiber administration system at the central office of the telecommunication provider.

5. The method according to claim 4, further including the step of providing a shelf controller that is coupled to both said test signal source and said optical signal monitor.

6. The method according to claim 5, wherein said step of comparing the optical test signal introduced into the first of the two dedicated optical fibers to the optical test signal received from the second of the two dedicated optical fibers is performed by said shelf controller.

7. The method according to claim 2, further including the step of determining losses in said optical test signal introduced by said test signal source.

8. The method according to claim 1, wherein said step of monitoring said optical test signal includes the substeps of:

removing said optical test signal from the second of said two dedicated optical fibers; and converting said test signal into a corresponding electrical test signal.

9. A system for testing a pair of dedicated optical fibers that extend from a central office of a telecommunications provider to provide signals at a first primary transmission frequency to a specific customer facility through an optical fiber network, said system comprising:

an optical test signal source for producing an optical test signal at a second frequency above or below the first primary transmission frequency and for introducing said optical test signal at the second frequency into a first optical fiber of said pair of optical fibers, a wavelength division multiplexer located at or just prior to the customer facility, said wavelength division multiplexer being coupled to said pair of optical fibers, wherein said wavelength division multiplexer removes said optical test signal from said first optical fiber of said pair of optical fibers and loops said optical test signal at said second frequency removed from said first of said pair of optical fibers to the second of said pair of optical fibers to return said optical test signal to the central office of the telecommunications provider, a monitor for receiving said optical test signal from the second of the two dedicated optical fibers at the central office, and a comparator means for comparing the optical test signal introduced into the first of the two dedicated optical fibers to the optical test signal received from the second of the two dedicated optical fibers at the central office to determine losses in the two dedicated optical fibers.

10. The system according to claim 9, wherein said pair of optical fibers terminate at a fiber administration system in the central office of the telecommunications provider.

11. The system according to claim 10, wherein said optical test signal source and said monitor are modules that are mounted within a shelf of said fiber administration system.

12. An improved fiber administration system for an optical fiber network, wherein said optical fiber network includes at least one dedicated pair of optical fibers that carry signals of a first primary frequency between said fiber administration system and a specific customer facility through said optical fiber network, said fiber administration system comprising:

a frame, wherein said frame defines at least one bay;

at least one shelf contained within said at least one bay;

an optical transmitter module disposed within said shelf, wherein said optical transmitter module creates an optical test signal at a second frequency that is higher or lower than the first primary frequency;

a monitor module disposed within said shelf;

a first wavelength division multiplexing module disposed within said shelf, wherein said first wavelength division multiplexing module optically interconnects both said optical transmitter module to a first optical fiber of the dedicated pair of optical fibers, and said monitor module to a second optical fiber of the dedicated pair of optical fibers;

a second wavelength division multiplexer disposed at or near the specific customer facility, said second wavelength division multiplexer adapted to loop said optical test signal at said second frequency from said first optical fiber to said second optical fiber.

13. The fiber administration system according to claim 12, further including a shelf controller electronically coupled to both said optical transmitter module and said monitor module.

14. The fiber administration system according to claim 13, wherein said shelf controller reads data from both said optical transmitter module and said monitor module regarding said optical test signal.

15. The fiber administration system according to claim 12, wherein said optical transmitter module and said monitor module are contained within a common module housing on said shelf.

* * * * *